United States Patent [19]

Huboud-Peron

[11] 3,974,596

[45] Aug. 17, 1976

[54] MACHINE TOOL FOR CUTTING-OFF RAILS

[75] Inventor: Jean Huboud-Peron, La Tour-du-Pin, France

[73] Assignees: Societé des Anciens Establissements L. Geismar, Neuilly-sur-Seine; Societe Turripinoise de Mecanique Stumec, Saint-Didier-de-la-Tour, both of France

[22] Filed: Mar. 19, 1975

[21] Appl. No.: 559,875

[30] Foreign Application Priority Data

Apr. 9, 1974 France .................. 74.12377

[52] U.S. Cl. ............... 51/178; 51/241 LG
[51] Int. Cl.² ........................ B23B 23/02
[58] Field of Search ............ 51/99, 178, 241 LG, 51/241 S; 30/372, 388; 144/133 R; 83/490, 698

[56] References Cited

UNITED STATES PATENTS

| 564,297 | 7/1896 | Whitfield | 83/490 |
| 2,081,360 | 5/1937 | Mall | 51/241 LG |
| 2,214,141 | 9/1940 | Mall | 51/241 LG |

Primary Examiner—Al Lawrence Smith
Assistant Examiner—Nicholas P. Godici
Attorney, Agent, or Firm—Haseltine, Lake & Waters

[57] ABSTRACT

A machine-tool for cutting off rails comprising a motor block, an arm carrying a grinding wheel at its end and a machine-tool carrying holder to be secured onto the rail, said holder comprising two hingedly interconnected arms and pivoted with their free ends to said vice and said machine-tool, respectively.

6 Claims, 6 Drawing Figures

MACHINE TOOL FOR CUTTING-OFF RAILS

The present invention relates to improvements to cutting-off machine-tools or like devices for cutting off rails or like bars, of the kind comprising a cutting member consisting of an abrasive or grinding wheel as well as a machine-tool carrying support or holder adapted to be secured onto the rail to be cut off.

In the present state of the art are known two kinds of cutting-off machine-tools which distinguish from each other through the design of the support or holder secured to the rail by means of a vice-like clamping means.

According to the first kind the vice comprises an arm pivotally movable or swingable in a plane extending at right angles to the rail onto which is mounted a sliding block. The cutting-off machine-tool proper is pivotally connected to said sliding block about an axis extending in parallel relation to that of the grinding or abrasive wheel.

This known device exhibits the following inconveniences:

the slideway-forming arm has to be carefully protected or shielded by means of bellows since otherwise the sliding motion of the slide block becomes impossible but such bellows are fragile and likely to be quickly damaged by shocks and burns produced by projections;

the cutting-off machine-tool made fast to the rail is supported or borne by the operator only;

the rail cutting operation cannot be carried out under good turning-over conditions, i.e., by attacking the rail at first from one side and then from the other side.

According to the second known kind of cutting-off machine-tool the vice is provided with a recumbent U-shaped part the ends of the legs of which extend over an equal distance from the rail and are lying within the cutting plane comprise each one a member such as a bearing element forming a fulcrum and a pivot for the cutting-off machine-tool.

Such a device exhibits the following drawbacks:

it does not allow to fully cut the rail off by attacking same from one side only;

the support is very cumbersome or bulky and may not be used at a switch or turnout point or when the rail is provided with a guard or check-rail.

For overcoming such inconveniences the object of the present invention is to provide improvements in machine-tools for cutting rails, of the type comprising a motor block or housing or like engine case, an arm at the end of which is provided an abrasive or grinding wheel and a support or holder to be secured to the rail by means of a vice, said device being characterized in that the cutting-off machine-tool carrying holder consists of a pair of hingedly interconnected arms which are pivotally connected with their free ends to said vice and to said cutting-off machine-tool, respectively.

The invention will be better understood and further objects, characterizing features, details and advantages thereof will appear more clearly as the following explanatory description proceeds with reference to the accompanying diagrammatic drawings given by way of limitative example only illustrating a presently preferred specific form of embodiment of the invention and wherein.

Figure 1:
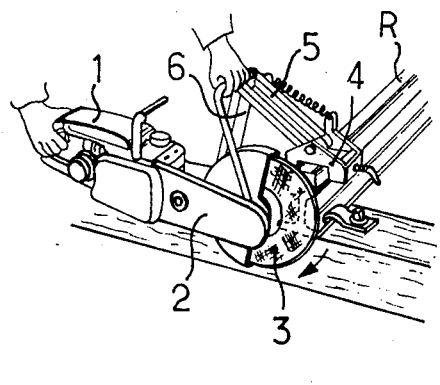
FIGS. 1 and 2 are perspective views drawn on a small scale and showing the operation for cutting off a rail through a turning over step by means of the cutting-off machine-tool according to the invention.

Referring to the drawing it is seen that the cutting-off machine-tool comprises in a known manner a body portion or block 1 enclosing a motor, engine or like power drive or prime mover and an arm 2 to the end of which is secured an abrasive or grinding wheel 3.

Figure 2:
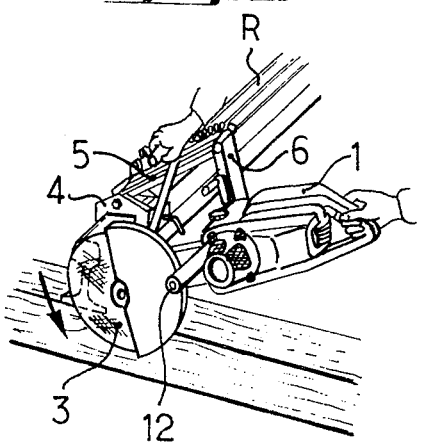

According to the invention the holder or support consists of a vice 4 to which is pivotally connected an arm 5 to the end of which is pivotally connected a second arm 6 onto which is in turn pivoted the cutting-off machine-tool, means being provided on both the latter and the end of the arm 6 for enabling the turning over or reversal of the cutting machine-tool without having to detach, remove or release the vice 4 (FIGS. 1 and 2).

Figure 4:
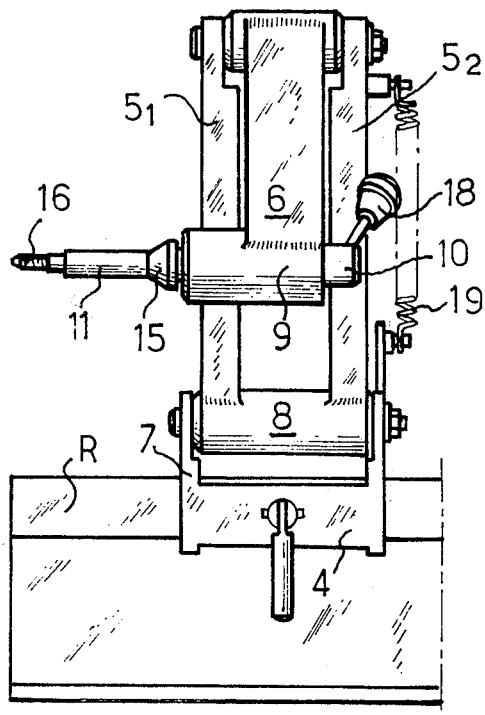
FIG. 4 shows the support or holder carrying the cutting-off machine-tool according to FIG. 3 as secured onto a rail.
Figure 6:
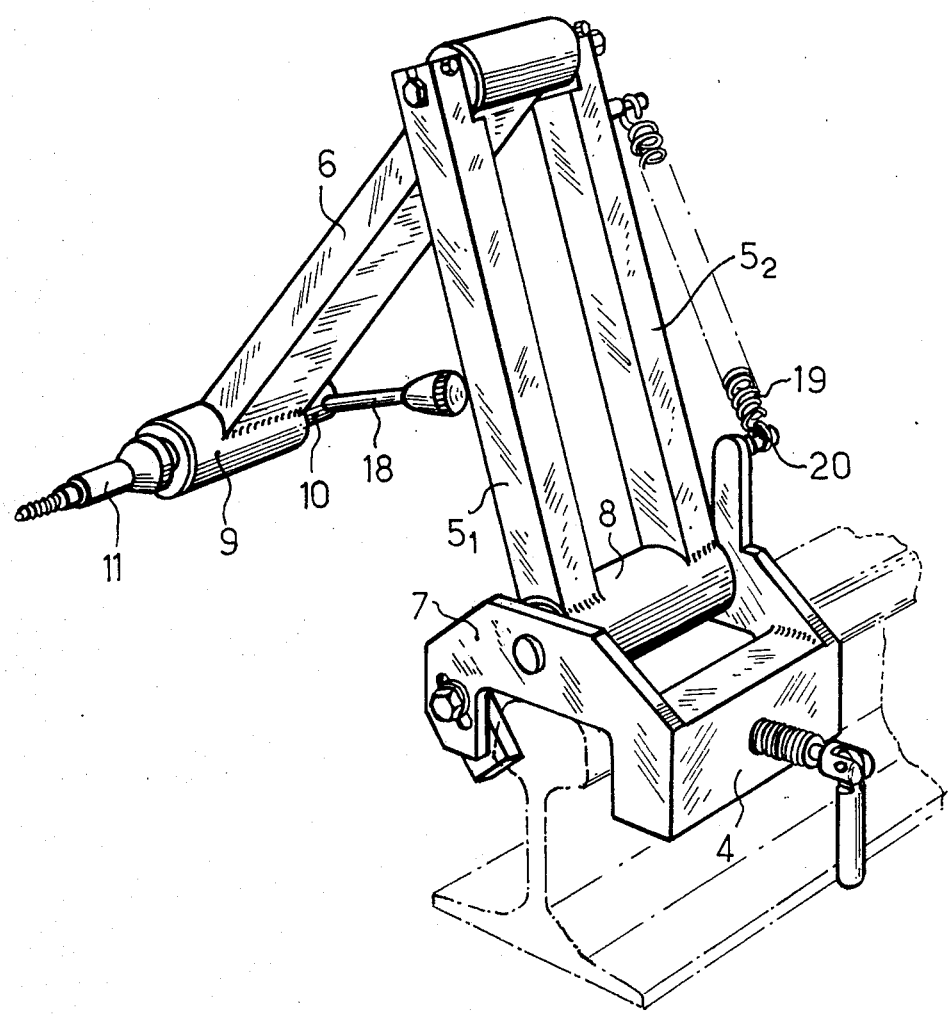
FIG. 6 is a perspective view showing the support or holder alone.

The vice 4 which is adapted to be made fast onto the rail R in a known manner forms with its upper portion a clevis or yoke 7 in which the arm 5 is pivotally connected for swinging motion. Indeed as shown in particular in FIGS. 4 and 6 the arm 5 is of double construction and comprises two legs or limbs $5_1$ and $5_2$ integral with a hub 8. In this fashion the arm 5 forms with its legs or limbs $5_1$ and $5_2$ a clevis enabling to provide the pivotal connection of the arm 6 under good conditions.

The free end of the arm 6 comprises a bearing-like hub 9 in which is journalled a rotary shaft or spindle 10 held axially against motion and extending at 11 beyond the said bearing to project therefrom.

Figure 3:
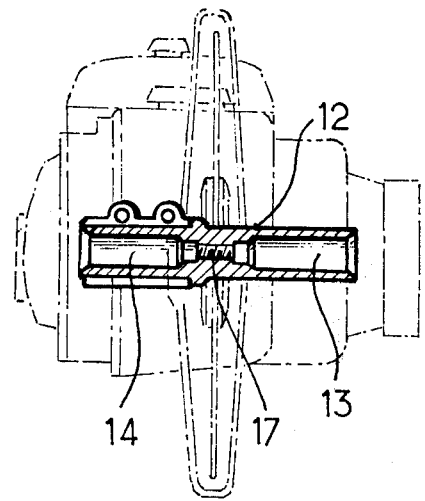
FIG. 3 is a diagrammatic view illustrating the cutting machine-tool alone and showing in section a special member enabling it to be secured onto the support or holder.

The cutting-off machine-tool may be mounted on the extension 11 of the shaft or spindle 10. For this purpose and as shown in FIG. 3 it comprises a sleeve 12 the centre line axis of which extends in parallel relation to that of the grinding wheel 3 and which sleeve extends in symmetrical relationship with respect to the centre plane of said grinding wheel.

The sleeve 12 is formed with two like bores 13 and 14 in any one of which may be fitted the extension 11 of the spindle 10 in engaging relationship therewith.

In this manner and without removing the support from the rail R it is possible by slipping the sleeve 12 over the extension 11 through the bore 13 to carry out a cutting operation such as illustrated in FIG. 1. On the other hand when the sleeve 12 is fitted over the extension 11 through the bore 14 it is possible to effect a cutting operation such as shown in FIG. 2.

The device which has just been described therefore enables to carry out a cutting operation through turning over or reversal of the machine-tool by means of a simple handling step. FIGS. 1 and 2 also show in an obvious manner that it is possible to cut the rail by attacking same from one or the other side thereof provided that the diameter of the grinding wheel be large enough.

According to a particular form of embodiment the centring of the sleeve 12 on the extension 11 is provided by a tapering surface portion 15 whereas its fastening is obtained by means of the screw-threaded end 16 of said extension which may be screwed into an intermediate tapped or threaded bore 17 of said sleeve this latter operation being facilitated by the provision of a working handle or operating grip 18 provided on the spindle or shaft 10.

Figure 5:
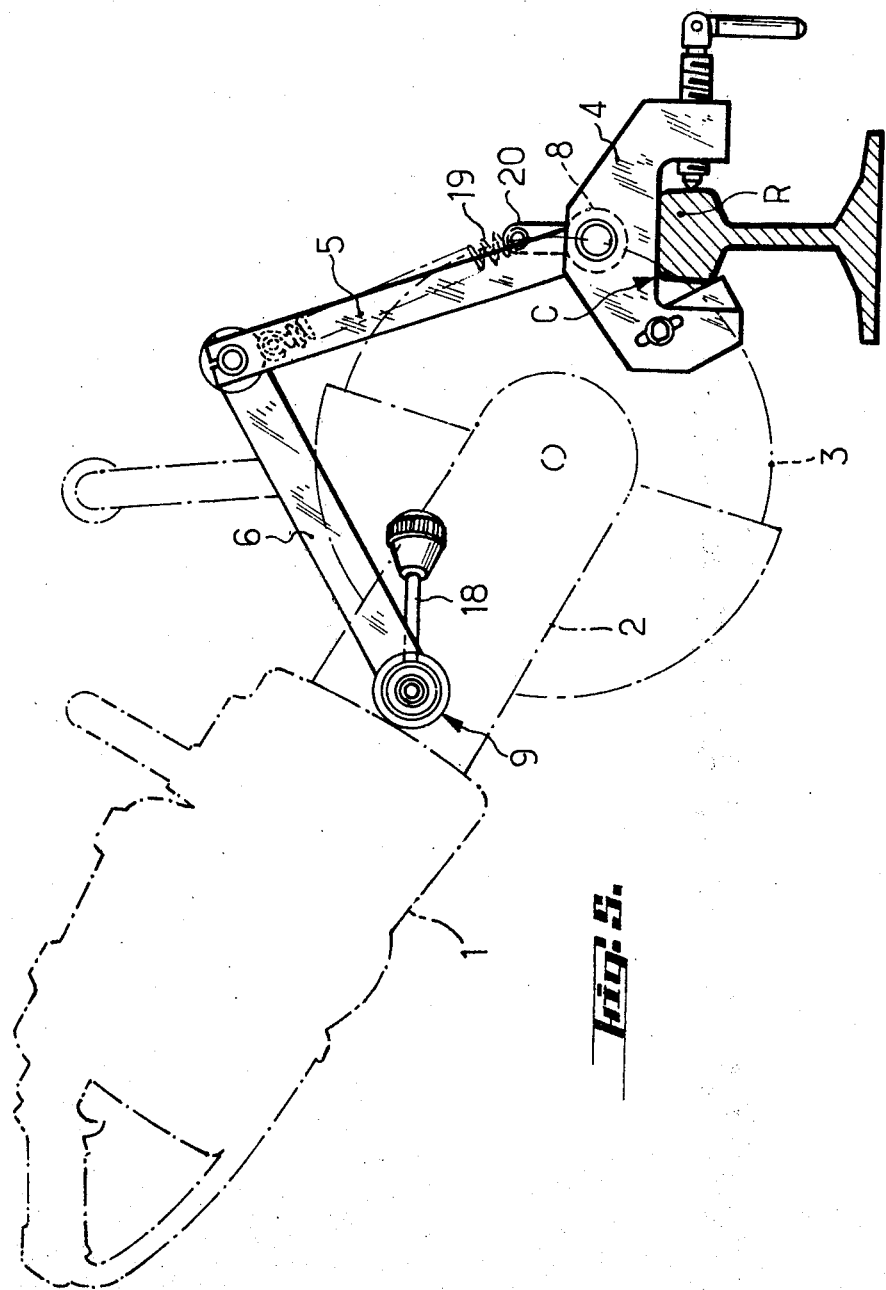
FIG. 5 shows the cutting-off machine-tool in working position and in particular the action of the holder.

As appears from FIG. 5 this device comprises three pivot axes and forms with the point of contact C between the grinding wheel and the rail a deformable quadrilateral having two sides of variable lengths. Owing to this fact the cutting-off machine-tool has to be kept in the position required by the operator which is an exacting and tiresome or tedious operation.

To overcome such a drawback the invention also provides a device enabling to compensate for, offset or balance the weight of the machine.

This result is obtained through a spring 19 secured with one of its ends to the upper portion of the arm 5 and with the other end to the vice 4 at a position 20 distinct from the pivotal connection of said arm with the vice.

The spring 19 has therefore the tendency to urge or bias the arm 5 backwards so that the fastening points of said spring and those of the pivotal connection of said arm are aligned in registering relationship.

In practice this action tends to keep the arm 5 in a substantially constant angular position and due to this fact the cutting-off machine-tool is suspended from the arm 6 so that the operator has then only to cause it to pivot or swing about the extension 11 for applying the grinding wheel against the rail.

It should finally be pointed that the device which has just been described may be used on all of the presently known cutting-off machine-tools since the mounting and positioning of the sleeve 12 for adapting the cutting-off machine-tool to the holder or support does not raise any particular technical problem as this sleeve is located on the arm 2 and extends between the usual belts or chains or like gear for operatively driving the grinding wheel.

It should be understood that the present invention is not at all limited to the form of embodiment which has just been described which has been given by way of example only.

The invention rather comprises all the technical equivalents of the means provided when same are used within the scope of the appended claims.

What is claimed is:

1. A machine-tool for cutting off rails, comprising a prime mover carrying arm, a grinding wheel rotatably mounted on said arm and driven by said prime mover, and a holder to be secured by a vise onto a rail to be cut off, wherein said holder comprises a first arm pivotally mounted at one end thereof onto said vise about an axis parallel with said rail, a second arm pivotally mounted at one end thereof onto said first arm about an axis parallel with said rail, said holder and said prime mover carrying arm further comprising means for pivotably mounting said prime mover carrying arm on either side thereof onto the other end of the second arm of said holder whereby the rail may be cut from either side alternatively.

2. The machine-tool according to claim 1, wherein said means comprise a sleeve opened at both ends and secured fixedly to the prime mover carrying arm, said sleeve having a center line axis parallel with a center line axis of the grinding wheel, and means for mounting said sleeve by one of its ends onto the said other end of the second arm of the holder.

3. The machine-tool according to claim 1, wherein said other end of the second arm of the holder is provided with a rotating shaft held against longitudinal motion and parallel with said rail and comprising an extension onto which said sleeve is fitted.

4. The machine-tool according to claim 3, wherein said sleeve comprises a threaded central bore and said extension is provided with a screw threaded end adapted to be screwed into said threaded central bore of the sleeve.

5. A machine-tool according to claim 3, wherein the ends of the said sleeve and the end of the said extension are provided with cooperating tapered surface portions for centering said sleeve onto said extension.

6. A machine-tool according to claim 1, wherein said holder comprises means for balancing the weight of the said prime mover carrying arm and the grinding wheel, said means including a spring one end of which is fastened to said first arm and the other end of which is fastened to said vise in a position spaced from the pivot axis of the first arm onto said vise.

* * * * *